United States Patent [19]
Gorog et al.

[11] 4,375,096
[45] Feb. 22, 1983

[54] MULTI-BANDWIDTH OPTICAL PLAYBACK APPARATUS WITH ELONGATED READ SPOT

[75] Inventors: Istvan Gorog, Princeton; Michael J. Lurie, East Brunswick, both of N.J.

[73] Assignee: RCA Corporation, New York, N.Y.

[21] Appl. No.: 242,250

[22] Filed: Mar. 10, 1981

[51] Int. Cl.³ .......................... G11B 7/00; G11B 7/18; G11B 27/36; G11B 11/18

[52] U.S. Cl. ..................................... 369/102; 369/54; 369/116; 369/117; 369/118; 369/13

[58] Field of Search ............... 369/102, 109, 116, 117, 369/118

[56] References Cited

U.S. PATENT DOCUMENTS

| | | | |
|---|---|---|---|
| 3,842,194 | 10/1974 | Clemens | 178/6.62 |
| 4,044,379 | 8/1977 | Halter | 358/128 |
| 4,065,786 | 12/1977 | Stewart | 358/128 |
| 4,125,859 | 11/1978 | Oshida et al. | 369/117 |
| 4,179,708 | 12/1979 | Sheng et al. | 369/109 |

FOREIGN PATENT DOCUMENTS

53-129603  11/1978  Japan .................. 369/118

Primary Examiner—George G. Stellar
Attorney, Agent, or Firm—E. M. Whitacre; J. S. Tripoli; J. E. Roehling

[57] ABSTRACT

Recovery from a record of data recorded in an elongated information track, comprising undulations representative of the data is effected by an optical playback system. In the system, the data is recorded within two substantially different frequency bands. The optical playback system has a dual response characteristic to provide improved response at the two different frequency bands. A modifying means interposed in the light beam path shapes the light beam to effect this dual response characteristic (i.e., two different bandwidth responses).

15 Claims, 9 Drawing Figures

MULTI-BANDWIDTH OPTICAL PLAYBACK APPARATUS WITH ELONGATED READ SPOT

This invention relates to an apparatus for optically reading information recorded on the surface of a record medium and, more particularly, to apparatus for reading information which has been recorded over a relatively wide frequency band, for example, for reading video information recorded over a high frequency deviation range and audio information recorded over a relatively low frequency deviation range.

The playback principles of the present invention are applicable to the recovery of data recorded in an information track as a succession of undulations of varying length along the length of the track.

In certain high density information record/playback systems, video information is recorded as relatively short wavelength (e.g., 0.4 μm) reflectivity, transmission or relief variations along the length of an information track. Illustratively, the method of recording may be of the type shown in U.S. Pat. No. 4,044,379, issued to J. B. Halter. Pursuant to the Halter method, an electromechanically driven stylus (e.g., of diamond) responsive to a combined video and audio signal, records relatively short geometric variations representative of the time variations of the signal to be recorded in a metal substrate. After the electromechanical recording operation, the metal substrate has a relief pattern corresponding to that which is desired in the final record. Stampers which are used to produce production line records are made from the substrate and a vinyl record is formed, having the desired relief pattern, from the stamper.

In one illustrative format for electromechanical cutting disclosed in the Halter patent, a composite video signal is additively combined with the accompanying audio signal. In accordance with this method, the accompanying audio signal is caused to frequency modulate a low frequency sound carrier over a low frequency deviation range (illustratively, 716±50 KHz). In a picture modulator, the composite color video signal (including luminance signals occupying a given band of frequencies and chrominance signals appearing as sideband components of a modulated chrominance subcarrier interleaved with luminance signal components in an intermediate region of the given band) is caused to frequency modulate a high frequency picture carrier over a high frequency deviation range (illustratively, 4.3–6.3 MHz). The peak-to-peak amplitude of the sound modulator output is held at a level which is small relative to the peak-to-peak amplitude level of the picture modulator output, with an illustrative level ratio being 1:10. The respective modulated carriers are combined in a linear adder and applied to a recorder which may be a Halter electromechanical recorder controlled in response to the signal developed by the adder. The recorder is used to record the composite signal as geometric variations (i.e., undulations) on the metal substrate.

The specification of the sound carrier recorded on a video disc is generally critical to the performance of the video disc system. The peak-to-peak amplitude of the sound carrier recorded on a high density information record, such as a video disc described in U.S. Pat. No. 3,842,194 to J. K. Clemens is very small—illustratively, the sound carrier amplitude may be 85 Å peak-to-peak. Deviation of the amplitude of the sound carrier from that which is specified may adversely affect the quality of the video and audio reproduction. For example, if the sound carrier is not cut deep enough the signal-to-noise ratio may be degraded or, on the other hand, if it is cut too deep then sound beats may be visible during the video reproduction.

To assure high quality video and audio reproduction during disc playback, it is generally agreed that certain measurements regarding the quality of the information recorded on the metal substrate should be made prior to producing production line records. An optical playback apparatus is used for reproducing, and thus verifying, the information recorded according to the Halter electromechanical recording method.

In its simplest form, the surface pattern of a metal substrate can be considered as a set of adjacent and parallel one-dimensional gratings with no guard space between the adjacent gratings. The gratings correspond to the signal tracks. The video signal wavelengths, especially on the inner radius signal tracks, are much smaller than the track to track spacings. Illustratively, the track spacing is about 2.5 μm.

An objective lens of an optical playback system of numerical aperture (N.A.) whose aperture is fully illuminated with a plane wave of light having wavelength λ produces at its focal plane a focused spot such that about one-half of the optical power is within a circle of diameter D where $$D = \lambda/2NA \tag{1}$$

The illuminating optics of the optical playback apparatus should be chosen such that the focused spot diameter is small enough to both resolve the shortest wavelength of interest and to maintain adjacent track crosstalk at an acceptably low level. Therefore, in practice extremely high numerical apertures (e.g., NA>0.8) must be used to resolve the smallest signal wavelengths on the metal substrates.

One optical playback system for reading a metal substrate having signals cut according to a Halter method is described in U.S. Pat. No. 4,065,786 issued on Dec. 27, 1977 to W. C. Stewart. According to the Stewart system, the differential phase representative of the recorded information of a light beam reflected from the metal substrate surface is detected by a split photodetector. Thus, the output signal from the split photodetector is representative of the signal recorded on the metal substrate surface. The frequency response of a differential phase optical playback system to sine wave signals may be approximated by a triangular response characteristic having a peak response in the middle of the frequency band with a linear roll off to an upper and lower cutoff frequency.

Ideally, lenses should be selected such that frequencies of the recorded information occur in the vicinity of the peak response of the optical system. However, it is very difficult to provide an optical system having a uniform response to wideband signals. For example, in a recording system where slot shaped signal elements are recorded on a flat surface, if the differential phase optical readout system is operated with a uniformly illuminated diffraction limited objective lens having a rectangular aperture and the lens is chosen so that the optical readout system is optimized for a video signal of 5 MHz at a particular radius, the response of the system to the 716 KHz audio signal will be about 17 dB lower.

In addition to the problem of providing an optical system which has a suitable response characteristic for wideband signals, another problem comes about as a result of the groove shape according to the preferred Halter method. In this system, a playback stylus rides in a V-shaped groove on the disc surface.

Because of the V-groove, the low frequency performance cannot be improved by simply using a low NA lens. The read beam incident on the disc surface is reflected by the V-shaped groove at angles such that little, if any, light would be collected by a low NA lens.

In accordance with the principles of the present invention, an optical playback system is provided that improves the signal-to-noise performance at low frequencies without any substantial reduction in the signal-to-noise performance at high frequencies.

Further, in accordance with the principles of the present invention, an optical playback system for recovering data recorded in an information track on a storage medium is provided. The data includes information recorded within a first given band of frequencies and information recorded within a second given band of frequencies. The information track has a succession of undulations representative of the data along the length thereof. The system comprises an objective lens for focusing a light beam to a spot on the information track where the light spot has a dimension along the length of the information track. The objective lens has a given numerical aperture. A means for modifying the shape of the light beam is provided to improve the recovery of the data recorded within the first given band of frequencies. The modifying means affects the shape of the light beam such that the dimension of the light spot along the length of the information track is lengthened to reduce the frequency response of the optical system without introducing the problem associated with a low NA lens. Further, the system includes means for establishing relative motion between the light spot and the information track and means for developing signals representative of the recorded data. The developing means is responsive to the diffraction of the focused light by the undulations during the occurrence of the relative motion.

In accordance with one aspect of the invention, the shape modifying means is used in combination with an objective lens having a high numerical aperture. When the information is recorded in V-shaped grooves, the light reflected from the record, and containing the information, is collected by the full aperture of the lens by properly positioning the shape modifying means and high NA lens, i.e., the return beam is not blocked from reaching the developing means as would happen if a low NA lens were used.

Other features and advantages of the invention will be more fully understood from the following detailed description of the preferred embodiment, the appended claims and the accompanying drawing in which:

Figure 1:
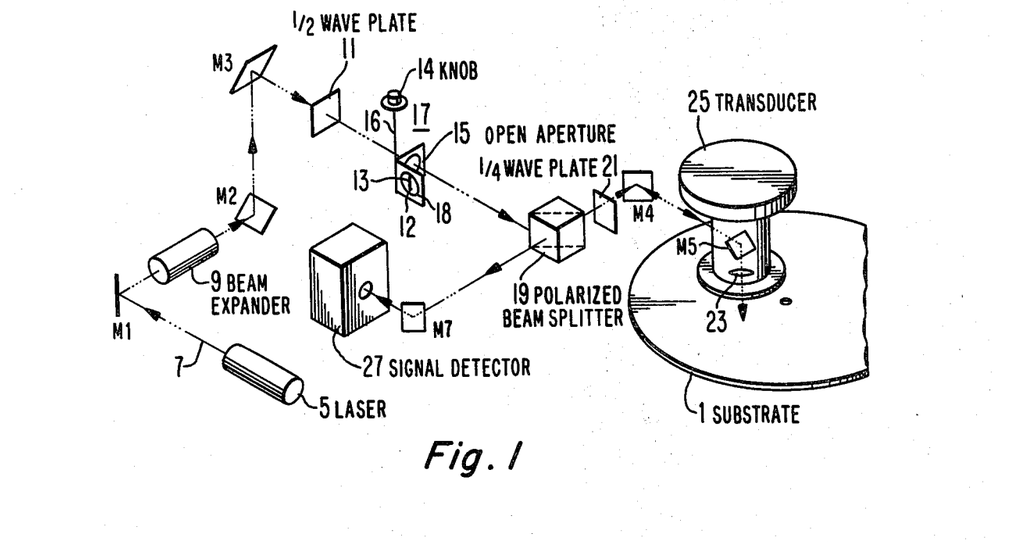
FIG. 1 is a perspective view, partially in block diagram form, of an optical playback system in accordance with the principles of the present invention.

Referring to FIG. 1, in the apparatus shown, a disc shaped record carrier (substrate) 1 is rotated by a motor (not shown). Illustratively, record carrier 1 may be of a type described in the aforementioned Clemens patent (i.e., the metal substrate which has been recorded in accordance with the method described in the aforementioned Halter patent). After the electromechanical recording operation, the recorded surface of the metal substrate 1 has a relief pattern corresponding to that which is desired in a final production record. The apparatus of FIG. 1 provides a system for verifying the information cut on the metal substrate.

A source of radiation 5 emits a beam of light 7. Illustratively, radiation source 5 may be a helium-neon laser emitting a beam of linearly polarized coherent light of generally circular contour at a wavelength of 633 nm. The beam of light 7 enters beam expander 9 and emerges generally with no change in shape but enlarged in cross section. This enlarged light beam enters half-wave plate 11 where the plane of polarization is rotated according to the orientation of the axis of the half-wave plate. The light beam 7 continues passing through the open aperture 15 of modifying means 17. The operation of modifying means 17 in cooperation with half-wave plate 11 will be explained in detail infra. The enlarged light beam enters the entrance face of polarized beam splitter 19. The orientation of the plane of polarization of light beam 7 determines the path of the emerging light beams. The light beam of interest herein is that beam which is reflected 90° to impinge on quarter-wave plate 21. The light beam enters quarter-wave plate 21 wherein the light is changed from a linearly polarized state to a circularly polarized state. Lens 23, interposed between quarter-wave plate 21 and substrate 1, receives the light beam and focuses the beam to form a light spot on a track of substrate 1. Transducer 25 may be associated with lens 23 to maintain proper focus on the information track; illustratively, the transducer may incorporate suitable light focus means such as described in copending U.S. patent application Ser. No. 218,073, filed on Dec. 19, 1980 for M. J. Lurie. Further, light beam 7 may be directed to track the center of an information track on the surface of substrate 1 by means (not shown) described in the aforementioned Stewart patent.

The focused light beam is diffracted by the recorded data, appearing in a track as a succession of undulations. The reflected light which is approximately circularly polarized is collected by lens 23. The collected light enters quarter-wave plate 21 wherein it is changed from a circularly polarized state to a linearly polarized state. The reflected light arrives at beam splitter 19 with a plane of polarization which is shifted 90° relative to the plane of polarization it had when it left beam splitter 19 and passes through beam splitter 19 in a direction orthogonal to the incident light path. From beam splitter 19 the light continues until it impinges onto a light accepting region of light detector 27. Illustratively, detector 27 may be a split photodetector of a type illustrated in the aforementioned Stewart patent. The output signal from detector 27 is delivered to suitable (not shown) circuitry for processing on a TV receiver (for example).

Figure 2A:
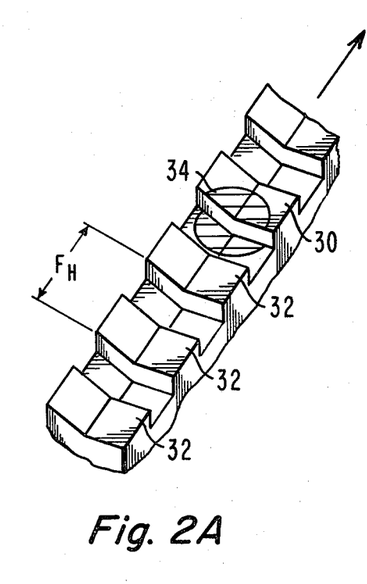
FIGS. 2A and 2B show perspective views of a signal track of a video disc record.
Figures 2A, 2B:
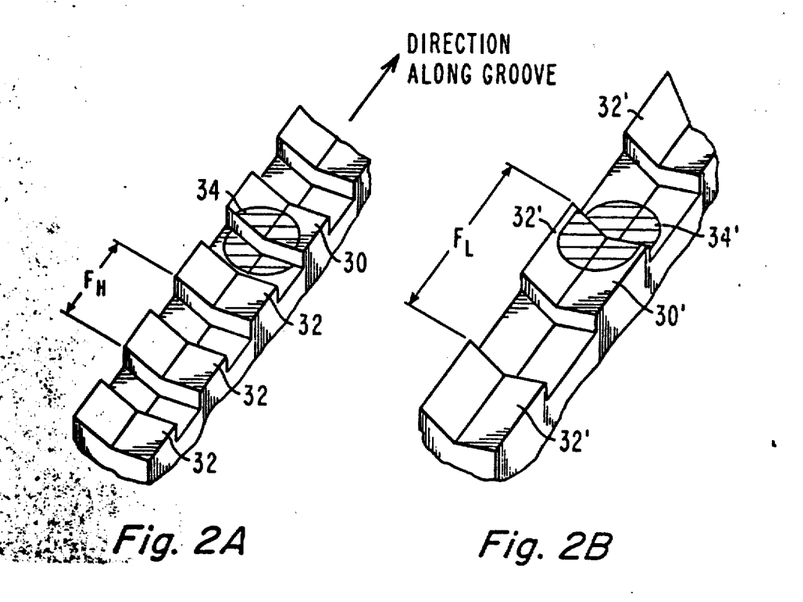
Figure 2B:
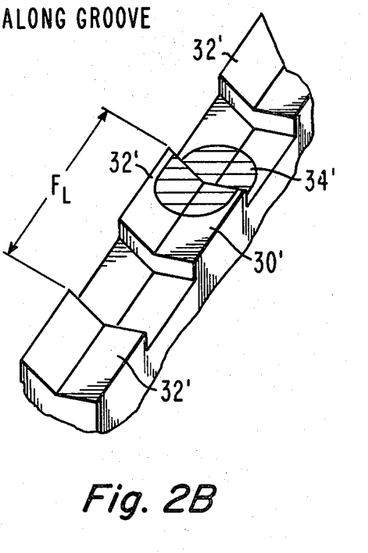

An explanation of the operation of an optical playback system will now be made. FIG. 2A represents a V-shaped signal track 30 having undulations 32 (e.g., pits) recorded therein at a spatial wavelength $F_H$. For ease of illustration, the undulations of FIGS. 2A and 2B are shown as having steep, square wave-like transitions. The following discussion applies equally to sinusoidal undulation, such as in the preferred Halter method. As a matter of fact, wherever reference is made to spatial wavelength ($F_H$, $F_L$), it is to be understood that the reference is being made to a sinusoidal Fourier component having spatial wavelength $F_H$, $F_L$. Illustratively, the spatial wavelength $F_H$ may be in the middle of the video bandwidth described in Halter (e.g., 5 MHz of a Clemens type video disc recorded at the inside radius of the substrate). The read beam of this system is shown as a light spot 34 impinging in the center of signal track 30. Preferably light spot 34 is focused according to equation 1 as a diffraction limited spot on information track 30. To provide this diffraction limited spot the aperture of lens 23 of FIG. 1 is completely filled by light beam 7.

Figure 3:
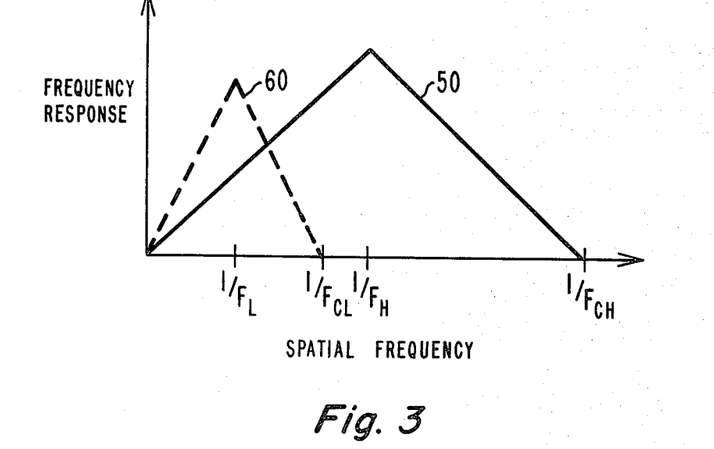
FIG. 3 shows graphically the frequency response characteristic of the optical system of FIG. 1.

Referring to FIG. 3, curve 50 indicates a triangular frequency response which is an approximation of the complex response of the optical system of FIG. 1 when the aperture of lens 23 is fully illuminated. The aperture is chosen such that the peak response $F_H$ occurs near the middle of the high frequency band (illustratively, at 5 MHz for the Clemens system). The problem with such an arrangement is that when the aperture is chosen to optimize the high frequency response, the low frequency response suffers. For example, with respect to the Clemens disc, when the system is chosen for peak response in the middle of the video band (e.g., 5 MHz) the response in the audio band is down almost 20 dB, thus adversely affecting the measurement of test bands on a Halter substrate or providing an audio response which is substantially degraded.

Figure 4:
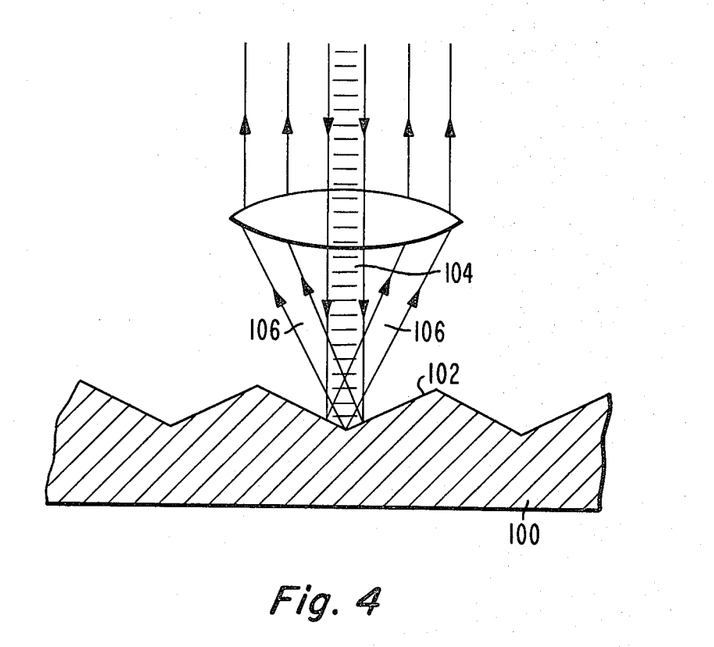
FIG. 4 illustrates the effect of a V-shaped groove on the reflection of a read beam.

FIG. 4 represents a simplified description of the interaction of a focused spot and a V-groove. The V-shaped groove 102 on video disc 100 causes the incident light beam 104 which is directed toward the groove to be reflected (or transmitted) as a pair of beams 106 in a direction which is not parallel to the optic axis. The light beams 106 which carry the signal information are reflected such that if the lens NA were decreased to improve the signal response for low frequency signals, the return beams 106 would be cut off. To illustrate this, reference may be made to FIGS. 5A, 5B, and 5C.

Figure 5A:
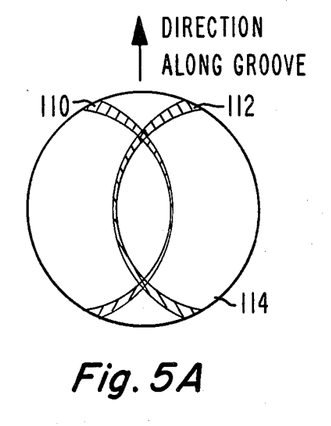
FIGS. 5A, 5B, and 5C show signal interference patterns for an optical system.
Figure 5B:
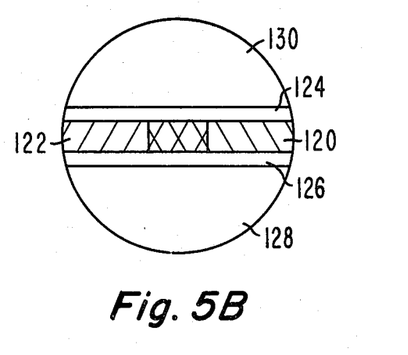
Figure 5C:
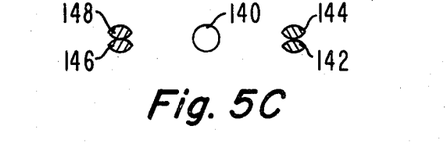

FIGS. 5A, 5B, and 5C show signal interference patterns that are present at the signal detector 27 of FIG. 1. For a high numerical aperture lens at low frequencies (e.g., NA=0.9), the shaded areas 110 and 112 of FIG. 5A represent the interference patterns on the signal detector of the overlap of the zero order light beams from the two sides of the V-groove with either the plus or minus first order light beams from the same side of the groove. In addition to the light which is contained in the signal interference patterns 110 and 112, most of the full aperture 114 is illuminated. The light which is not within shaded areas 110, 112 does not contribute to signal recovery; however, it does affect the response of the system because of the noise content.

In accordance with the present invention, the optical playback system is provided with an improved response at low frequencies. It has been discovered that by providing a system that has a switchable bandwidth or one that has two differently dimensioned illumination systems, a substantial improvement in signal response may be obtained.

Referring to FIG. 2B, a signal track 30' is shown having undulations 32' recorded therein at a spatial wavelength $F_L$. Illustratively, the pit spacing at low frequencies may be seven times the pit spacing at high frequencies. According to the Halter system, the spatial wavelength $F_L$ may be at the audio frequency (e.g., 715 KHz of a Clemens type video disc).

It has been discovered that if the effective numerical aperture of lens 23 is limited as described herein, the signal-to-noise of the system response at low frequencies is improved. It has been found that this is true even though the frequency response of the system has been reduced. For example, if a slit is used to modify the spot dimensions, the S/N is improved. The slit reduces the amount of non-signal bearing light and moves the signal bearing light from the edges of the aperture to the center. Both of these consequences of using a slit have the effect of improving the system performance.

The modification of the optical playback system to provide improved low frequency response will now be discussed with reference to FIG. 1. The apparatus of FIG. 1 is provided with modifying means 17 interposed between laser 5 and substrate 1. With modifying means 17 positioned as shown in FIG. 1 light beam 7 passes through open aperture 15 such that the aperture of lens 23 is fully illuminated; thus light beam 7 is focused on the substrate surface as a diffraction limited spot to read out the signals at the high frequency end of the bandwidth. On the other hand, when knob 14 is rotated 90°, stop 12 having a slit 13 therein (illustratively, having slit dimensions of 5 mm by 0.7 mm) is rotated on shaft 16 such that light beam 7 passes through the slit, thus shaping the light beam which passes to objective lens 23. By interposing slit 13 in the light beam path the effective numerical aperture of lens 23 is reduced in the signal direction and thus, the light spot 34' on the surface of the substrate is extended along the length of the information track as shown in FIG. 2B.

FIG. 5B shows the signal interference patterns on the detector surface for a combination slit and high numerical aperture lens. The shaded areas 102, 122 represent on the signal detector the overlap of the zero order light beams from the two sides of the V-groove with either the plus or minus first order light beams from the corresponding side of the groove on the signal detector. By using a slit and a high NA lens, the effective numerical aperture of the objective lens is reduced in the signal direction, for example, the NA goes from 0.9 to 0.09. Although there is still some light (i.e., areas 124 and 126) which does not contribute to the signal recovery, regions 128, 130 contain no light. This reduction in the non-signal bearing light and the relocation of the signal bearing light to the center of the aperture improves the signal-to-noise ratio at low frequencies.

Using a low numerical aperture lens will not generally improve the system response in the presence of V-grooves. FIG. 5C shows the effect of using a low numerical aperture. When a low numerical aperture 140 (e.g., NA=0.09) is used, the signal-containing light from the record 142, 144, 146, 148 entirely misses the aperture because of the V-shaped groove.

The operation of half-wave plate 11 will now be explained. Using the modifying means 17 presents certain problems with respect to the light output from the substrate surface. When light beam 7 passes through the open aperture 15 the light incident on signal detector 27 is substantially greater than when light beam 7 passes through slit 13 if no compensation is provided. To reduce the difference in incident light power between the two positions, light beam 7 is attenuated when modifying means 17 is in the open aperture position. The combination of half-wave plate 11 and beam splitter 19 provide the attenuation by properly positioning the optical axis of plate 11 with respect to the polarization axis of beam splitter 19. In the unattenuated position (i.e., when the light beam passes through slit 13) half-wave plate 18 is positioned in front of slit 13 having its optical axis arranged such that substantially all of the light incident on the entrance face of beam splitter 19 is reflected to pass through lens 23.

Of course, other techniques are available for attenuating light beam 7 when it passes through the open aperture. For example, with half-wave plates 11 and 18 removed a filter could be positioned in the open aperture 15 to attenuate the light beam. Half-wave plates 11, 18 provide individual and continuous adjustment of the light levels, and are, therefore, preferred.

The frequency response of the system of FIG. 1 may be represented by FIG. 3 which is an approximation. Curve 50 represents the response characteristic at high frequencies obtained with open aperture 15 of modifying means 17 in the beam path and curve 60 represents the frequency response at low frequencies obtained with half-wave plate 18 and slit 17 in the beam path.

Figure 6:
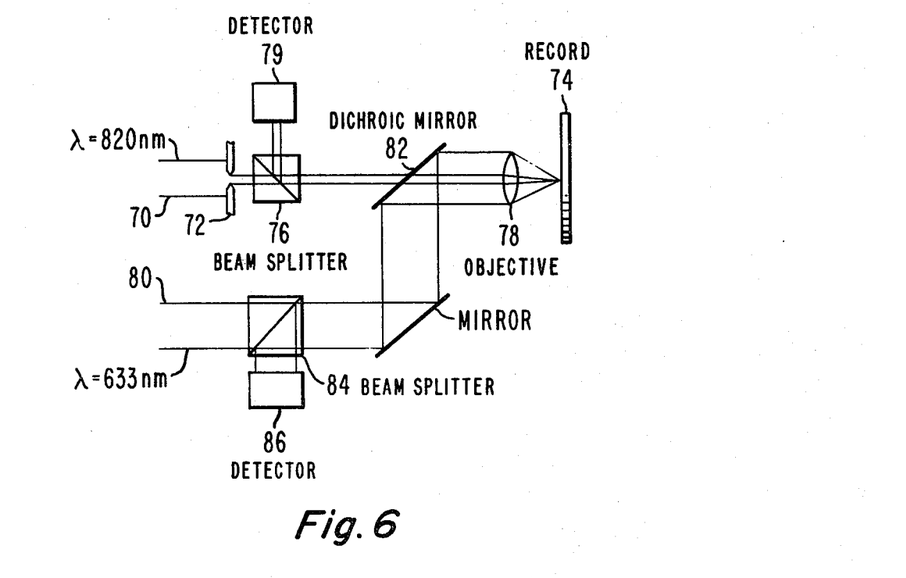
FIG. 6 shows an optical playback system in accordance with a further embodiment of the present invention.

Referring to FIG. 6, a system is shown which is optimized to provide high signal response for both the low and the high frequency bands. In this system, two differently dimensioned illumination systems are provided.

Light beam 70 (illustratively, of a wavelength of approximately 820 nm) is modified by a slit 72 such that the spot on record 74 is elongated along the length of an information track. Beam splitter 76 passes some of the light from light beam 70 to impinge on objective lens 78 on a first pass and reflects some of the light of light beam 70 to impinge on detector 79 on its return. Simultaneously, light beam 80 (illustratively, of a wavelength of 633 nm) is dimensioned such that it fully illuminates the aperture of lens 78, thus providing a diffraction-limited spot at the surface of record 74. Dichroic mirror 82 has the property of passing light of one wavelength (for example, the 820 nm) and reflecting light of another wavelength (for example, the 633 nm). Light beam 80 is reflected off the surface of record 74 to impinge on beam splitter 84. On the first pass through beam splitter 84 some of the light from light beam 80 passes through while on the return pass some of the light is reflected to impinge on detector 86. In accordance with the examples provided, detector 79 is provided to respond to low frequency audio signals while detector 86 responds to high frequency video signals.

While the principles of the present invention have been demonstrated with particular regard to the illustrated structure of the Figures, it will be recognized that various departures from such illustrated structure may be undertaken in practice of the invention. For example, a slit-shaped modifying means may be replaced with other devices such as an anamorphic beam expander that fills the aperture in one direction without the use of a slit. Also, the system is not limited to providing for only two bandwidths, of course, as many bandwidths may be provided for as physical considerations permit. Further, the principles of the present invention are applicable to groove shapes other than V-shaped, for example, to records having signal tracks which are flat.

What is claimed is:

1. An optical playback system for recovering from a storage medium data recorded in an information track including data recorded within a first given band of low frequencies and data recorded within a second given band of high frequencies, said information track having a succession of undulations representative of said data along the length thereof, said system comprising:

an objective lens for focusing a light beam to a spot on said information track, said light spot having a dimension in a direction along the length of said information track, said objective lens having a given numerical aperture;

means for establishing relative motion between said light spot and said information track;

means, responsive to the interaction of said focused light and said undulations during the occurrence of said relative motion, for developing signals representative of the data recorded in said information track; and means for modifying the shape of said light beam such that a substantial portion of the light incident on said developing means contains information representative of said recorded data and passes through said objective lens near the optical axis of a light path therethrough, said dimension of said light spot along said length of said information track being lengthened to reduce the frequency response of said optical system, recovery of said data recorded within said first given band of low frequencies being improved by modifying the shape of said light beam.

2. The system according to claim 1 wherein said means for modifying the shape of said light beam includes a stop having a slit-shaped opening interposed in the path of said light beam such that the effective numerical aperture of said objective lens is substantially reduced.

3. The system according to claim 1 wherein said means for modifying is positioned in a first position in the path of said light beam during recovery of said data recorded within said first given band of low frequencies and positioned in a second position such that said light beam is not affected by said modifying means during recovery of said data recorded within said second given band of high frequencies.

4. The system according to claim 3 further comprising means for attenuating the intensity of said light beam when said modifying means is in said second position.

5. The system according to claim 4 further comprising means for attenuating the intensity of said light beam when said modifying means is in said first position.

6. The system according to claim 1 wherein said means for modifying the shape of said light beam includes an anamorphic beam expander interposed in the path of said light beam.

7. An optical playback system for recovering from a storage medium data recorded in an information track including data recorded within a first given band of frequencies and data recorded within a second given band of frequencies, said information track having a succession of undulations representative of said data along the length thereof, said system comprising:

a light source for providing a beam of light;

an objective lens for focusing said light beam to a spot on said information track, said light spot having a dimension in a direction along the length of said information track, said objective lens having a given numerical aperture;

a first half-wave plate, positioned between said light source and said objective lens, for rotating the polarization of said light beam;

means for modifying the shape of said light beam including:
a. a support;
b. a second half-wave plate rotatably mounted in a first position on said support; and
c. a stop having a slit-shaped opening mounted in said first position on said support;

means, interposed in the path of said light beam, for directing said light beam in a first direction when said light beam is in a first polarized state and for directing said beam in a second direction when said light beam is in a second polarized state, the light directed in said first direction passing through said objective lens to a spot on said information track;

means for establishing relative motion between said light spot and said information track; and light detection means, responsive to the diffraction of said focused light by said information track during the occurrence of said relative motion, for developing electrical signals representative of said recorded data; wherein said light detection means includes means for responding to the overlap of a zero diffraction order of said diffracted light with either the plus or minus first diffraction orders thereof.

8. An optical playback system for recovering from a storage medium data recorded in an information track including data recorded within a first given band of frequencies and data recorded within a second given band of frequencies, said information track having a succession of undulations representative of said data along the length thereof, said system comprising:

a first light source for providing a light beam of a first given wavelength;

a second light source for providing a light beam of a second given wavelength;

an objective lens for focusing said first and said second light beams on said information track, said objective lens having a given numerical aperture;

means for establishing relative motion between said first and said second light beams and said information track;

means for developing signals representative of the data recorded in said information track; and means, interposed between said first light source and said information track, for modifying the shape of said light beam of said first given wavelength such that a substantial portion of the light incident on said developing means contains information representative of said recorded data and passes through said objective lens near the optical axis of a light path therethrough; the dimension along the length of said information track of a light spot incident on said information track of said light beam of said first given wavelength being lengthened to reduce the frequency response of said optical system, recovery of said data recorded within said first given band of frequencies being improved by modifying the shape of said light beam.

9. The system according to claim 8 wherein said means for modifying the shape of said light beam of said first given wavelength includes a stop having a slit-shaped opening interposed in the path of said light beam of said first given wavelength.

10. The system according to claim 8 wherein said means for modifying the shape of said light beam of said first given wavelength includes an anamorphic beam expander.

11. The system according to claim 9 or 10 further comprising means, interposed at a common point, in the paths of said light beams, for separating said light beam of said first given wavelength from said light beam of said second given wavelength.

12. The system according to claim 11 wherein said separating means comprises a dichroic mirror.

13. The system according to claim 12 wherein said first given band of frequencies is substantially lower than said second given band of frequencies.

14. The system according to claim 13 wherein said means for developing signals comprises:

a first split photodetector responsive to the diffraction of said light beam of said first given wavelength by said undulations representative of said data recorded within said first given band; and a second split photodetector responsive to the diffraction of said light beam of said second given wavelength by said undulations representative of said data recorded within said second given band.

15. The system according to claim 14 wherein said first given wavelength is approximately 820 nm and said second given wavelength is 633 nm.

* * * * *

UNITED STATES PATENT AND TRADEMARK OFFICE
CERTIFICATE OF CORRECTION

PATENT NO. : 4,375,096

DATED : February 22, 1983

INVENTOR(S) : Istvan Gorog et al.

It is certified that error appears in the above-identified patent and that said Letters Patent is hereby corrected as shown below:

The sheet of drawing showing Figure 1 should be deleted and the attached sheet substituted therefor.

Column 6, line 1, "715" should read -- 716 --.

Signed and Sealed this

Sixth Day of September 1983

[SEAL]

Attest:

Attesting Officer

GERALD J. MOSSINGHOFF

Commissioner of Patents and Trademarks

Fig. 1

UNITED STATES PATENT AND TRADEMARK OFFICE
CERTIFICATE OF CORRECTION

PATENT NO. : 4,375,096

DATED : February 22, 1983

INVENTOR(S) : Istvan Gorog et al.

It is certified that error appears in the above-identified patent and that said Letters Patent is hereby corrected as shown below:

The sheet of drawings showing Fig. 1 should be deleted and the attached sheet substituted therefor.

Column 6, line 1, "715" should read -- 716 --.

This certificate supersedes Certificate of Correction issued September 6, 1983.

Signed and Sealed this

Twentieth Day of September 1983

[SEAL]

Attest:

GERALD J. MOSSINGHOFF

Attesting Officer

Commissioner of Patents and Trademarks

Fig. 1

Fig. 2A     Fig. 2B